United States Patent
Augst

(10) Patent No.: US 10,832,577 B2
(45) Date of Patent: Nov. 10, 2020

(54) METHOD AND SYSTEM FOR DETERMINING ROAD USERS WITH POTENTIAL FOR INTERACTION

(71) Applicant: Bayerische Motoren Werke Aktiengesellschaft, Munich (DE)

(72) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 325 days.

(21) Appl. No.: 15/938,777

(22) Filed: Mar. 28, 2018

(65) Prior Publication Data

US 2018/0218610 A1    Aug. 2, 2018

Related U.S. Application Data

(63) Continuation of application No. PCT/EP2016/067855, filed on Jul. 27, 2016.

(30) Foreign Application Priority Data

Sep. 30, 2015  (DE) .................. 10 2015 218 964

(51) Int. Cl.
*G08G 1/16* (2006.01)
*B60W 50/14* (2020.01)
(Continued)

(52) U.S. Cl.
CPC ............. *G08G 1/164* (2013.01); *B60W 50/14* (2013.01); *G08G 1/0112* (2013.01);
(Continued)

(58) Field of Classification Search
CPC ...................................................... G08G 1/164
See application file for complete search history.

(56) References Cited

U.S. PATENT DOCUMENTS

| 8,362,922 B2 | 1/2013 | Kushi et al. |
| 9,335,178 B2 | 5/2016 | Nickolaou |

(Continued)

FOREIGN PATENT DOCUMENTS

| DE | 10 2010 038 180 A1 | 7/2011 |
| DE | 10 2012 022 563 A1 | 5/2014 |

(Continued)

OTHER PUBLICATIONS

PCT/EP2016/067855, International Search Report dated Dec. 12, 2016 (Seven (7) pages).

(Continued)

*Primary Examiner* — Alex C Dunn
(74) *Attorney, Agent, or Firm* — Crowell & Moring LLP

(57) ABSTRACT

A method for determining at least one road user with a potential for interaction in a route segment includes detecting, using a unit outside a first vehicle, information with respect to a plurality of road users entering a route segment at an entry point to the route segment, where the information comprises information about one or more properties of the plurality of road users. The method also includes determining service data based on the information with respect to at least one of the plurality of road users, and determining that the first vehicle is situated in the route segment or will be situated in the route segment after a predefined time interval has elapsed. Thereafter, service data is provided in the first vehicle.

19 Claims, 3 Drawing Sheets

(51) Int. Cl.
    *G08G 1/01* (2006.01)
    *G08G 1/0967* (2006.01)

(52) U.S. Cl.
    CPC . *G08G 1/096716* (2013.01); *G08G 1/096741* (2013.01); *G08G 1/096775* (2013.01); *G08G 1/166* (2013.01)

(56) References Cited

U.S. PATENT DOCUMENTS

| | | | |
|---|---|---|---|
| 10,229,595 B2* | 3/2019 | Loeillet | G08G 1/165 |
| 2004/0054687 A1* | 3/2004 | McDonough | G01C 21/32 |
| 2014/0197967 A1* | 7/2014 | Modica | G08G 1/0133 |
| | | | 340/932 |
| 2015/0211870 A1* | 7/2015 | Nickolaou | G01C 21/34 |
| | | | 701/28 |
| 2019/0143989 A1* | 5/2019 | Oba | B60W 40/08 |
| | | | 701/70 |

FOREIGN PATENT DOCUMENTS

| | | |
|---|---|---|
| DE | 10 2015 100 812 A1 | 7/2015 |
| JP | 2010-108403 A | 5/2010 |

OTHER PUBLICATIONS

German Search Report issued in German counterpart application No. 10 2015 218 964.3 dated Jul. 8, 2016, with Statement of Relevancy (Twelve (12) pages).

* cited by examiner

METHOD AND SYSTEM FOR DETERMINING ROAD USERS WITH POTENTIAL FOR INTERACTION

CROSS REFERENCE TO RELATED APPLICATIONS

This application is a continuation of PCT International Application No. PCT/EP2016/067855, filed Jul. 27, 2016, which claims priority under 35 U.S.C. § 119 from German Patent Application No. 10 2015 218 964.3, filed Sep. 30, 2015, the entire disclosures of which are herein expressly incorporated by reference.

BACKGROUND AND SUMMARY OF THE INVENTION

The invention relates to a method and a corresponding system for determining road users with potential for interaction and in particular for directly or indirectly providing corresponding service data for use in a vehicle function.

At the present time, in the context of various initiatives on the topic "Intelligent Transportation Systems" (ITS) inter alia on the part of the European standardization authorities ETSI and CEN, and also on the part of ISO, SAE and IEEE in the USA, communication protocols and cooperative safety applications are being standardized which are intended to make possible in the future cooperative driving free of accidents, if possible, which cuts across vehicle manufacturers. The safety applications addressed, and also the associated transmission protocols and data formats are documented inter alia in the ETSI standard EN 302 637 and in the SAE standard SAEJ2735. In this regard, the standard EN 302 637-2 defines e.g. a so-called Cooperative Awareness Message (CAM), which is transmitted at periodic intervals from one ITS station (e.g. from a vehicle) in order to inform another ITS station (e.g. a so-called ego-vehicle) in the vicinity about selected information (e.g. speed, acceleration and/or position) of the transmitting ITS station. The information exchanged between the ITS stations, e.g. on the basis of CAM messages, can be used in the respective ITS stations to identify risks of collision and, if appropriate, to initiate suitable countermeasures (e.g. warning indications).

However, the information that can be communicated to an ego-vehicle via an ITS message is limited or restricted. The present document addresses the technical problem of providing a method, a corresponding system and a computer program with which extended information about a traffic situation, in particular in a roadway segment ahead of an (ego-)vehicle, can be provided to the ego-vehicle.

In accordance with one aspect, a method for determining one or a plurality of road users in a route segment (also referred to as roadway segment) is described. The method comprises detecting, by means of a unit outside a first vehicle (wherein the unit outside the first vehicle is also referred to as vehicle-external unit and wherein the first vehicle is also referred to as ego-vehicle), useful information with respect to a multiplicity of road users entering a route segment at an entry point to the route segment.

The unit outside the first vehicle can preferably be installed together with a substantially immobile infrastructure device (e.g. with an interstate highway bridge, guard rail, etc.). Alternatively, a unit outside the first vehicle can be connected to another vehicle in a mobile fashion.

A unit outside the first vehicle can comprise one or a plurality of computing units and one or a plurality of sensors. In this case, one or a plurality of sensors, e.g. a camera or a laser scanner, can be configured for determining useful information.

The useful information comprises information about one or a plurality of properties of the multiplicity of road users. Said one or said plurality of properties of a road user can comprise in particular a permanent property of the road user, a variable, current property of the road user, and/or a relative property of the road user, relative to a current traffic situation. Said properties can be determined in particular on the basis of sensor data of a sensor of the unit outside the first vehicle.

The method further comprises determining service data on the basis of the useful information with respect to at least one road user from the multiplicity of road users. In this case, the service data can comprise one or a plurality of properties of at least one of the multiplicity of road users. Alternatively or additionally, the service data can comprise: information with respect to a roadway region of the route segment which should be traveled along or should not be traveled along; an instruction to a driver of the first vehicle to take action; information about a point in time and/or a region in which the route segment can be traveled along manually or in an automated manner; and/or a movement plan with respect to a movement of a road user and/or of the first vehicle in the route segment.

In this case, the movement plan can concern in particular a possible path guidance of the first vehicle, in particular longitudinal guidance and/or transverse guidance, in a near future. This can be expressed by temporal and geometric relationships, e.g. concerning a corresponding vehicle trajectory.

In particular, the movement plan can represent a sequence of two or more coordinates of the first vehicle at specific time intervals in the near future. Such a sequence can represent information about the order and/or time intervals for the occupying of at least one respective roadway region (or a position within the traveling region) by the first vehicle. The respective (absolute or relative) coordinates can also represent an alignment of the first vehicle, i.e. with respect to its current position or with respect to specific orientation points, e.g. traffic lights, a stop line or a specific lane.

In particular, service data can be determined with respect to one or a plurality of specific road users having one or a plurality of specific properties. In this case, service data can relate to one or a plurality of specific properties of the road user(s). In this case, the properties can also be properties which themselves are not directly relevant with respect to control of the first vehicle.

Such properties can be e.g. geometric dimensions or proportions of the road user; design features of the externally visible parts of the road user; color information, e.g. a color or a color combination of a road user; information concerning clothing of a pedestrian or of a driver, in particular someone in control of a two-wheeler; and/or a manufacturer's brand of the road user.

Moreover, the method comprises determining that the first vehicle is situated in the route segment or will be situated in the route segment after a predefined time interval has elapsed. It is thus possible to determine that service data might be of relevance to travel of the first vehicle through the route segment. If it was determined that the first vehicle is already situated in the route segment or will be situated there in the near future, then the service data can be provided in the first vehicle.

The service data can also comprise information representing a specific spatial and/or temporal validity of the service data, in particular a specific spatial and/or temporal validity of specific information contained therein. The service data can also comprise information about an operating mode or operating parameters for one or a plurality of vehicle functions.

In this case, providing the service data can comprise directly or indirectly transmitting, by means of the unit outside the first vehicle, the service data to the first vehicle. The service data determined by the unit can be "pushed" e.g. to one or a plurality of vehicles which are situated in the route segment or will soon be situated there.

Alternatively, providing the service data can comprise transmitting, by means of the first vehicle, a request message to the unit outside the first vehicle, wherein the request message indicates the route segment for which service data are interrogated by the first vehicle. The interrogated service data can then be communicated to the first vehicle.

The method can furthermore comprise using the service data for a vehicle function of the first vehicle. In particular, the service data can be used by the first vehicle to guide the first vehicle at least partly automatically. Alternatively or additionally, the service data can be used by the first vehicle to output the service data at least partly to a driver of the first vehicle. Alternatively or additionally, the service data can be used by the first vehicle to output to the driver of the first vehicle an instruction to take action and/or a warning indication with respect to road users in the route segment.

The method makes it possible to determine for a first vehicle, in an efficient manner, information about road users in an imminent route segment and to use said information for a vehicle function. In particular, the method makes it possible to provide information (e.g. with respect to the total amount of road users in a route segment) which cannot be determined, or can be determined only in a complex manner, by environment sensors of the first vehicle.

The method can further comprise determining one or a plurality of relevant road users from the multiplicity of road users which may be relevant to the first vehicle when traveling along the route segment. Then (possibly reduced) service data with respect to said one or said plurality of relevant road users can be determined and provided in the first vehicle. In this regard, the amount of exchanged data can be reduced to essential data, as a result of which the evaluation of the service data in the first vehicle can be facilitated and improved.

Relevant road users here are in particular road users which, for another road user, e.g. for the first vehicle, with a probability that exceeds a specific measure, will have a direct effect on the longitudinal guidance and/or transverse guidance of the other road user, or require a particular or particularly high attention, e.g. on account of specific types of risks.

Determining a relevant road user can comprise determining a measure of interaction for a road user. In particular, a potential interaction of the road user with the first vehicle can be considered here. The measure of interaction can indicate for example a probability that the first vehicle will overtake the road user; that the first vehicle will be overtaken by the road user; and/or that the road user will obstruct travel of the first vehicle on a roadway of the route segment. Alternatively or additionally, the measure of interaction for a road user can be dependent on one or a plurality of properties of the road user, in particular on a type (i.e. on a class) of the road user, on movement data of the road user, on a relative speed of the road user, on a predicted intention of the road user, on a current lane of the road user and/or on a degree of automation of the road user.

By determining a measure of interaction and by selecting relevant road users on the basis of the measure of interaction, it is possible to further increase the quality of the determined and transmitted service data (and thus also the quality of the vehicle function in the first vehicle). In particular, the service data can be provided only or predominantly for road users having a specific potential for interaction (exceeding one or a plurality of measures) for the first vehicle.

The method can further comprise detecting, by means of a further unit outside the first vehicle, useful information with respect to at least one road user leaving the route segment at an exit point. The service data can then also be determined on the basis of the useful information with respect to the at least one road user. By detecting the road users at an entry point and at an exit point, it is possible to determine the amount of road users in a route segment in a precise manner. The quality of the service data and the quality of the vehicle functions implemented therewith can thus be increased further.

As already set out above, a unit outside the first vehicle can comprise a detecting road user (e.g. a vehicle) situated in the route segment. For this purpose, the detecting road user can comprise one or a plurality of environment sensors configured to detect other road users in an environment of the detecting road user. In this regard, useful information with respect to road users in a route segment can be detected and provided in a particularly efficient manner.

In this case, the environment of the detecting road user can comprise a partial region of the entire route segment. Useful information with respect to a total amount of the road users in the route segment can be detected by a multiplicity of detecting road users in the route segment. A crowdsourcing approach can thus be used in order to provide useful information about the road users in a route segment in a particularly efficient manner.

Determining service data can comprise determining, on the basis of the useful information with respect to the multiplicity of road users, order information representing a order of the road users in the route segment. With the use of the order information, the first vehicle can prepare for travel in the route segment with increased accuracy.

The method can further comprise detecting, by means of a first vehicle, environment data with respect to an environment of the first vehicle. The service data can then be coordinated with the environment data by the first vehicle. In this regard, the quality of a vehicle function in the first vehicle can be increased further.

The service data can comprise external identification information with respect to at least one first road user in the route segment. In this case, the external identification information makes it possible to identify the first road user in the multiplicity of road users in the route segment. The method can further comprise detecting, by means of the first vehicle, vehicle-side identification information that makes it possible to identify the first road user in a limited amount of different road users. It is then possible, depending on the external identification information and depending on the vehicle-side identification information, to extract useful information with respect to the first road user from the service data. This enables the first vehicle to acquire concrete additional information (i.e. useful information, for instance properties) about individual road users in the route segment in a precise manner. In this regard, vehicle functions in the first vehicle can be improved further.

Preferably, service data can comprise an assignment of useful information and one or a plurality of identification properties.

In particular, in the first vehicle, depending on the service data provided and depending on the vehicle-side identification information, the service data, in particular the useful information contained therein, can be assigned to a road user.

The assignment can be effected in the event of a significant correspondence between external identification information and the vehicle-side identification information or in the event of identification of a specific scientific dependence between these items of identification information. In this case, two or more items of external identification information can be assigned to the two or more items of vehicle-side identification information.

In this case, a (complete) correspondence of the external identification information and the vehicle-side identification information is not absolutely necessary for implementing the method. In particular, the assignment of the external identification information and the vehicle-side identification information can be effected depending on a determined measure of similarity and/or a determined measure of a plausibility.

By way of example, it is possible to determine a measure of plausibility of a specific assignment between external identification information and vehicle-side identification information. The assignment can thereupon be effected depending on one or a plurality of degrees of correspondence and/or degrees of plausibility.

In this case, a vehicle or a road user can preferably be a motor vehicle or a two-wheeler (motorcycle, moped, pedelec, Segway, bicycle). This results in advantages discussed here and further advantages comprehensible to the person skilled in the art without difficulty. Furthermore, a road user can alternatively also correspond to a different type of vehicle (watercraft, aircraft) or a pedestrian. The method is preferably applied to mobile, in particular currently moving, road users.

The method, discussed here principally from the viewpoint of one (first or ego-)vehicle, can be applied to a multiplicity of the road users reciprocally in such a way that a multiplicity of the road users simultaneously or alternately have the role of the "first vehicle". In this case, by way of example, the safety or the uniform manner of driving of the road users participating in the method can be optimized step by step. Furthermore, the method can also be applied in such a way that it leads to optimization of the traffic flow in the roadway segment. Inter alia, the method also affords the advantage that it is not necessary to identify the road users in order to implement the method.

In accordance with a further aspect, a computer program, in particular a computer program product, is described. The computer program can be loaded if appropriate directly into the internal memory of a digital device (in particular of an electronic control unit of a driver assistance system in a vehicle comprising a computing unit). Furthermore, the computer program can comprise software code segments that implement the steps of the method as claimed in any of the method claims described when the computer product runs on the digital device. In this case, it is possible to provide different computer programs for a unit outside the first vehicle and for a first vehicle.

In accordance with a further aspect, a vehicle is described which is configured to perform the vehicle-side method steps of the method described in this document.

In accordance with a further aspect, a unit outside the first vehicle is described, which unit is configured to perform the method steps of the method described in this document which are performed on the part of the unit outside the first vehicle.

It should be noted that the methods, devices and systems described in this document can be used both by themselves and in combination with other methods, devices and systems described in this document. Furthermore, any aspects of the methods, devices and systems described in this document can be combined with one another in diverse ways. In particular, the features of the claims can be combined with one another in diverse ways.

Other objects, advantages and novel features of the present invention will become apparent from the following detailed description of one or more preferred embodiments when considered in conjunction with the accompanying drawings.

BRIEF DESCRIPTION OF THE DRAWINGS

The invention is described in greater detail below on the basis of exemplary embodiments. In the figures here.

DETAILED DESCRIPTION OF THE DRAWINGS

As set out in the introduction, the present document addresses the technical problem of providing for a vehicle, which can be referred to as ego-vehicle, as comprehensive information as possible about a traffic situation in a route segment. In this regard, it is possible to provide in the ego-vehicle in a reliable and robust manner extended driver assistance systems, in particular partly and highly automated driving, for said route segment.

Highly automated driving is currently controllable for many, but not for all conceivable, combinations of diverse road users in different configurations. Different risks, some of which are difficult to assess, may be present depending on the concrete traffic situation. Furthermore, typically not all possible maneuvers can be carried out in an automated manner by an ego-vehicle if specific types and/or arrangements of road users (e.g. motorcyclists, vehicles having a high differential speed with respect to the ego-vehicle, etc.) are situated in the vicinity of the ego-vehicle.

Typically the ego-vehicle does not have complete knowledge of the road users and the properties thereof which are involved or might be involved in a traffic situation. The sensor-based detection by means of environment sensors of the ego-vehicle is typically restricted (e.g. with regard to range), such that particularly under conditions with increased difficulty (concealment, weather, etc.) sufficient information is not available regarding the road users (and the properties thereof) with which the ego-vehicle will be confronted in the near future. Furthermore, the provision of environment sensors for high-quality driver assistance systems and for further vehicle functions is typically very cost-intensive.

Exemplary embodiments of a method by which the disadvantages mentioned above can be overcome are described below.

Figure 1:
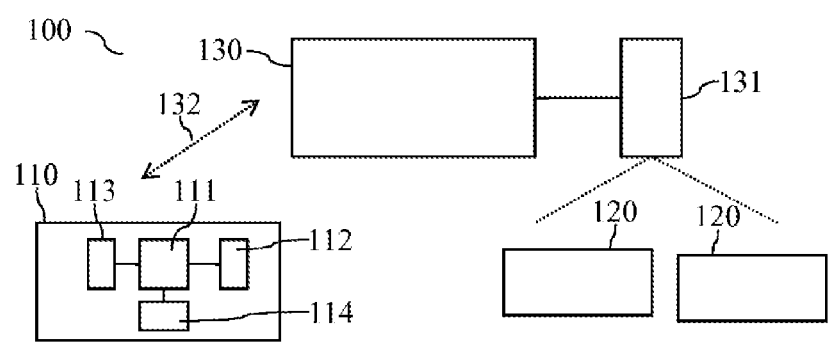
FIG. 1 shows a block diagram of one exemplary system for providing useful information about road users in a roadway segment.

FIG. 1 shows one exemplary system 100 for providing useful information about a traffic situation (in particular about road users or generally about one or a plurality of objects) in a route segment. The system 100 comprises a vehicle-external unit 130, 131 comprising at least one sensor 131 (e.g. a camera, a radar sensor, an ultrasonic sensor, etc.) in order to detect sensor data in a specific route segment. In particular, the sensor 131 can be configured to detect one or a plurality of road users 120 (i.e. generally one or a plurality of objects) in a route segment. By way of example, a camera can detect image data which indicate a road user 120 (e.g. a vehicle) in the route segment.

The vehicle-external unit 130, 131 comprises a processing unit 130 (e.g. a server) configured to evaluate the sensor data of the at least one sensor 131. In particular, the vehicle-external unit 130, 131 can be configured to determine, on the basis of the sensor data, useful information about said one or said plurality of road users 120 in a route segment (e.g. a position of a road user 120, a direction of movement of a road user 120, a type or kind of a road user 120, etc.). The useful information about said one or said plurality of road users 120 can be stored in a storage unit of the vehicle-external unit 130, 131.

The system 100 further comprises an ego-vehicle 110 situated before or in the route segment. The ego-vehicle 110 typically comprises at least one environment sensor 112 configured to detect environment data regarding an environment of the ego-vehicle 110. In particular, the environment sensor 112 can be configured to detect environment data regarding one or a plurality of the road users 120 in the route segment. A control unit 111 of the ego-vehicle 110 can be configured to transmit a request message to the vehicle-external unit 130, 131 via a communication unit 113. The communication unit 113 can be configured to communicate with the vehicle-external unit 130, 131 (in particular with the processing unit 130) via a wireless communication connection 132. The request message comprises e.g. a request to the vehicle-external unit 130, 131 to provide useful information about the specific route segment. The processing unit 130 is configured to transmit a response message to the ego-vehicle 110 via the communication connection 132, said response message comprising the useful information regarding the (requested) route segment (and the one or the plurality of road users 120 situated therein).

The ego-vehicle 110 can use the useful information regarding the route segment to provide a vehicle function, in particular a driver assistance function. In particular, the control unit 111 of the ego-vehicle 110 can control one or a plurality of actuators 114 (e.g. a drive motor, a brake and/or a steering system) of the ego-vehicle 110 depending on the useful information. The functional scope and/or the reliability of driver assistance functions can be improved by the use of vehicle-external useful information.

It is thus possible to provide a stationary sensor system 131 (e.g. on an interstate highway bridge) at the entry to a roadway or route segment (e.g. on an interstate highway). From an expedient perspective and with a specific degree of detailing, the sensor system 131 detects a concrete number of road users 120 in the route segment having respective properties. In particular, the respective class (automobile, truck, motorcyclist, pedestrian, animal) and the respective contours and/or dimensions can be detected and determined. In addition, the movement data or the current driving style or the current behavior of the road users 120 can also be detected. It is typically not necessary to identify the individual road users 120.

A further (optional) stationary sensor system 131 at the end of a roadway or route segment can analogously determine the properties of the road users 120 that leave the roadway or route segment.

It is thus possible to determine useful information about the amount of road users 120 (having specific classes/properties) which are situated within a roadway segment and which can interact with one another and/or with the ego-vehicle 110 within the roadway segment. Said information can be used in the ego-vehicle 110 to support driver assistance functions or highly automated driving.

It is thus possible to provide useful information about an amount of road users 120 which can interact with an ego-vehicle 110 driving in a (partly) automated manner in a route segment. Said useful information can be provided e.g. by a wireless router (WLAN, LTE, etc.) on an interstate highway bridge or in a backend. The ego-vehicle 110 can be configured to assign the road users 120, detected at least coarsely by the vehicle-inherent sensor system 112, on the basis of the useful information provided, which comprises e.g. a description of the road users 120 in the route segment, to the road users 120 detected by the vehicle-external unit 130, 131. The vehicle functions of the ego-vehicle 110 thus have a larger and more precise amount of information concerning relevant road users 120. This additional useful information would not be able to be determined solely by the vehicle sensor system 112, or would be able to be determined thereby only with great complexity. Furthermore, the provision of a vehicle-external sensor system 131 makes it possible to ensure that all road users 120 in the route segment can be detected. The ego-vehicle 110 can thus plan and carry out driving maneuvers in a reliable manner on the basis of the useful information. In particular, on the basis of the useful information the ego-vehicle 110 acquires prior knowledge regarding what road users 120 with what properties should be expected in a route segment. Furthermore, the ego-vehicle 110 can obtain detailed useful information about the individual road users 120 by means of an assignment.

Figure 2A:
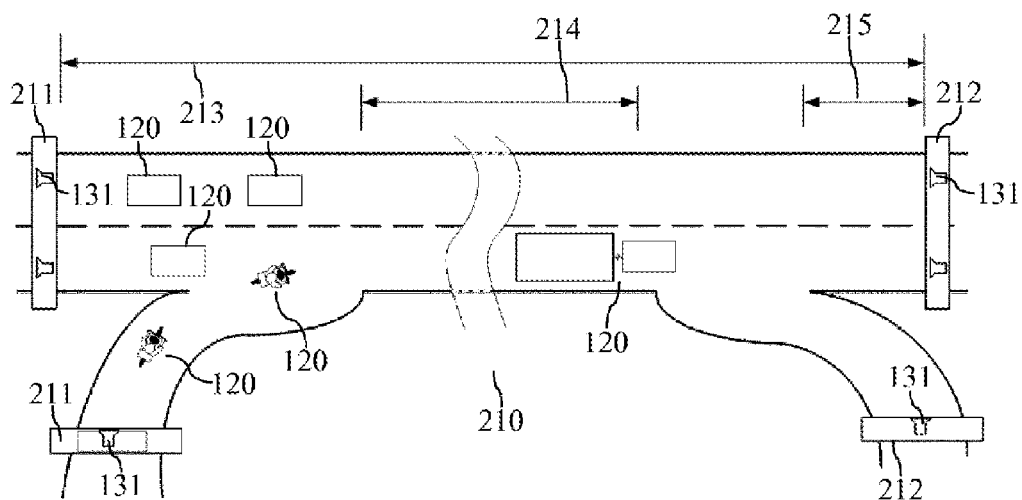
FIGS. 2*a*, 2*b*, 2*c* show exemplary traffic situations.
Figure 2B:
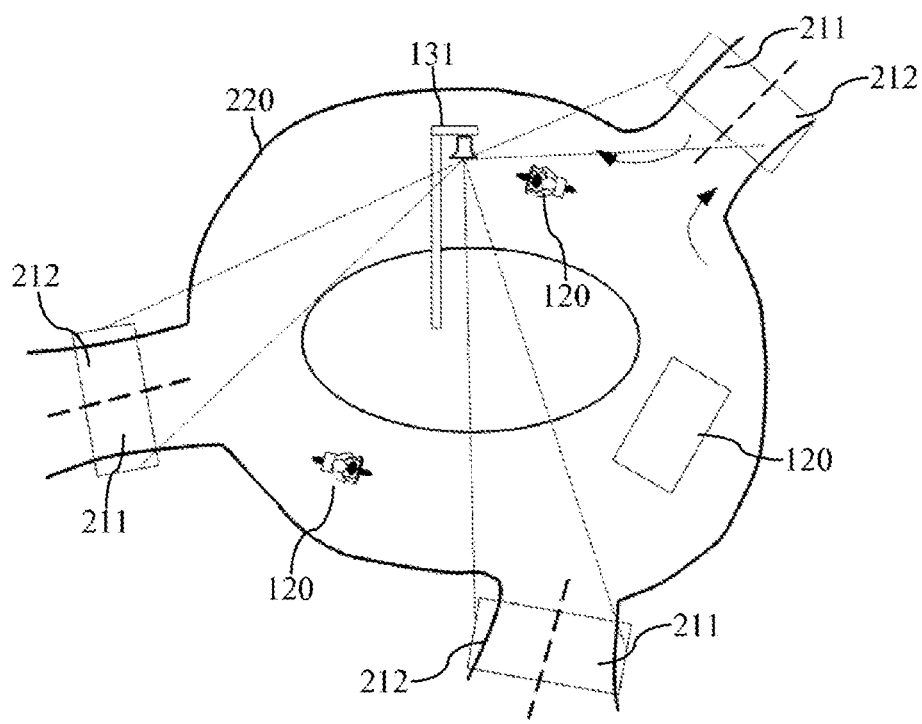
Figure 2C:
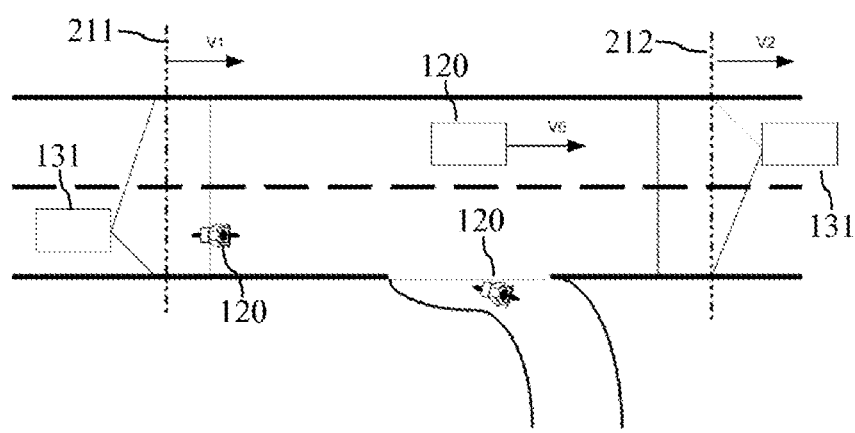

FIGS. 2a, 2b and 2c show exemplary traffic situations. FIG. 2a shows a route segment 213 on an interstate highway 210. Said route segment 213 comprises one or a plurality of entry regions 211, through which road users 120 can enter the route segment 213, and one or a plurality of exit regions 212, through which road users 120 can leave the route segment 213. The route segment 213 can comprise a core region 214, through which all road users 120 have to pass. Furthermore, the route segment 213, in the case of a plurality of entry regions 211 and/or a plurality of exit regions 212, can comprise partial regions 215, through which only some of the road users 120 have to pass.

The route segment 213 comprises one or a plurality of vehicle-external, stationary sensors 131 configured to detect useful information regarding the road users 120 at said one or said plurality of entry regions 211 and/or at said one or said plurality of exit regions 212. This useful information can be provided to an ego-vehicle 110.

FIG. 2b shows a roundabout 220 having a central sensor 131 for detecting the road users 120 at the entry regions 211 and/or at the exit regions 212 of the roundabout 220 as route segment.

FIG. 2c shows a virtual route segment, wherein the sensor system of a vehicle is used as "vehicle-external" sensor 131 in order to detect useful information about road users 120 at an entry region 211 and/or at an exit region 212 of the virtual route segment.

Figure 3:
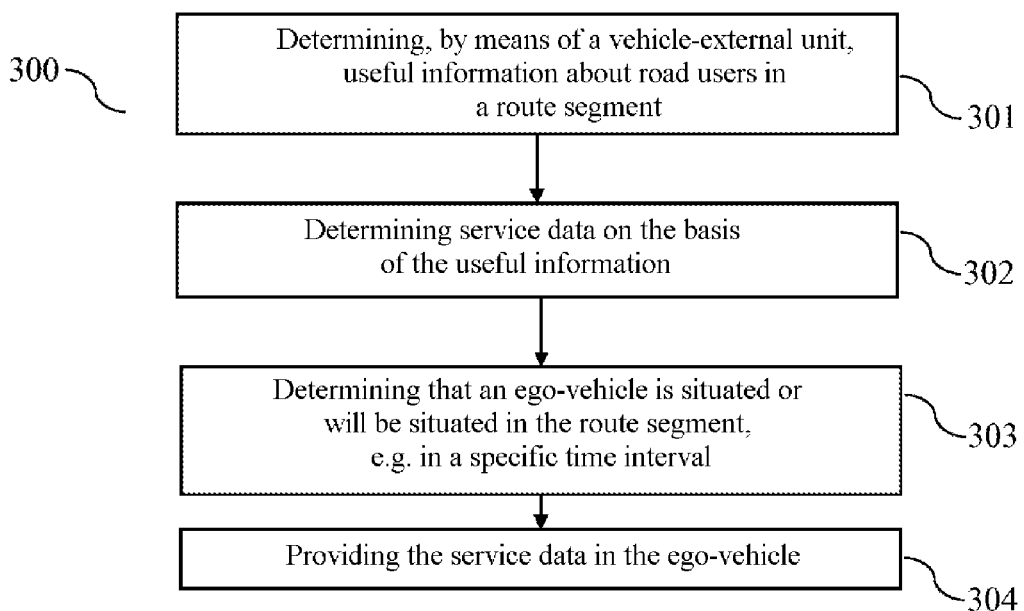
FIG. 3 shows a flow diagram of one exemplary method for determining useful information about road users in a roadway segment.

FIG. 3 shows a flow diagram of one exemplary method 300 for determining one or a plurality of road users 120 in a route segment 214. The method 300 comprises detecting 301, by means of a unit 130, 131 outside an ego-vehicle 110 (also referred to as first vehicle), useful information with respect to a multiplicity of road users 120 entering a route segment 214 at an entry point 211 to the route segment 214. In this case, the useful information comprises information about one or a plurality of properties of the multiplicity of road users 120.

The method 300 further comprises determining 302 service data on the basis of the useful information with respect to the multiplicity of road users 120. Furthermore, the method 300 comprises determining 303 that the ego-vehicle 110 is situated in the route segment 214 or will be situated in the route segment 214 after a predefined time interval has elapsed. If this is the case, then the service data can thereupon be provided in the ego-vehicle 110 (step 304). The ego-vehicle 110 can then use the service data in the implementation of a vehicle function. In this regard, improved vehicle functions can be provided in the ego-vehicle 110 in an efficient manner.

Exemplary aspects of the method 300 for determining useful information about a route segment are described below. In particular, the method 300 described in this document can be designed for determining relevant road users 120 within a route segment 213. To that end, one or a plurality of properties of road users 120 at an entry point 211 (i.e. at an entry region) to the route segment 213 can be determined. This is carried out by means of a device 130, 131 situated outside an ego-vehicle 110. Furthermore, it is possible to determine a data set representing the properties of the detected road users 120 entering the route segment 213. Moreover, it is possible to determine service data (i.e. useful information) that are dependent on the data set determined. Said service data can be transmitted to at least one ego-vehicle 110 which is situated in the route segment 213 or will be situated in the route segment 213 in the near future.

In this case, relevant road users are road users 120 that should be taken into consideration during travel of the ego-vehicle 110 within the route segment 213, in particular for specific vehicle functions during travel within the route segment 213. In other words, relevant road users are road users 120 that have or may have a (greater or lesser) potential for interaction among one another and/or with the ego-vehicle 110. By way of example, the useful information can indicate with what road users 120 the ego-vehicle 110 must cope, e.g. for highly automated driving, in the route segment 213. If appropriate, the relevant road users 120 can comprise all road users within the route segment 213. Furthermore, the road users 120 can be differentiated according to relevance or according to potential for interaction.

The device 130, 131 outside the ego-vehicle 110 can comprise a (stationary) infrastructure device, which is preferably combined with other technical means, e.g. with traffic lights or with an interstate highway bridge or with a toll collect apparatus. The device 130, 131 can comprise a backend computer and/or means for access to backend or cloud information. The device 130, 131 outside the ego-vehicle 110 can be mobile, if appropriate, and move e.g. with another vehicle (as illustrated in FIG. 2c). That is to say that, as an alternative or in addition to a stationary sensor system, the detection of the properties of the road users 120 in a route segment 213 can be effected by the sensor system of other traveling vehicles.

The properties of the road users 120 can be determined at least for a direction of travel of the route segment 213. Furthermore, it is possible to detect the properties of the road users 120 at one or a plurality of possible entry regions 211 to the route segment 213.

A route segment 213 can be a structurally separate segment of a road network (e.g. an expressway or an interstate highway). In this case, the route segment 213 can be configured in such a way that, without additional measures, it can be assumed that no additional road user 120 appears within the route segment 213 or disappears from the latter.

The route segment 213 can thus be part of an, in particular structurally separate, road. The detection of the road users 120 can be effected (if appropriate only) at an entry point 211 to the route segment 213. If appropriate, a route segment can be "dynamic" and can be defined in an up-to-date manner as a mobile segment of the roadway, e.g.—200 meters to +200 meters around a specific road user 120. A route segment 213 can also be a course required for a specific maneuver of an ego-vehicle 110, in particular a specific roadway area.

Exemplary properties of a road user 120 are at least one contour of the road user 120 (from a specific perspective). The contour is readily detectable, e.g. from an interstate highway bridge and is advantageous for planning and carrying out a driving maneuver of the ego-vehicle 110. Typically, detecting a property of a road user 120 once is sufficient, that is to say that constant camera observation for carrying out a maneuver is typically not necessary. The one or the plurality of ego-vehicles 110 can then control their respective vehicle functions on the basis of the service data (i.e. on the basis of the useful information) and the properties contained therein regarding one or a plurality of road users 120.

The service data comprise data that preferably serve to support a DAS (driver assistance system), PAD (partly automated driving) or HAD (highly automated driving) function of at least one ego-vehicle 110 or for providing information for the driver in an ego-vehicle 110. The service data can correspond to the data set of the properties that is determined by the vehicle-external device 130, 131. By way of example, the complete data set comprising the detected data about the road users 120 can be transmitted to at least one ego-vehicle 110. The service data for use in a specific vehicle function can then be determined, on the basis of the data set, by a control unit 111 of the ego-vehicle 110. Alternatively, the service data (if appropriate specifically for an ego-vehicle 110) can be determined by the vehicle-external device 130, 131 outside the ego-vehicle 110 and be communicated to the ego-vehicle 110.

The service data can represent the number, in particular a concrete amount, of road users 120 having respective specific properties which may be relevant to the road users 120 among one another and/or to a specific ego-vehicle 110 when the route segment 213 is traveled along. That is to say that, depending on the service data, it is possible to determine the amount of interaction partners (relevant to the ego-vehicle 110) in the traffic (in particular for a specific maneuver) within the route segment 213. In this case, the relevant road users 120 can preferably be determined within the ego-vehicle 110 or alternately outside the ego-vehicle 110.

As already set out above, the service data can be generated outside the ego-vehicle 110 and can be determined and provided specifically for at least one specific ego-vehicle 110. In this case, the service data can comprise useful information of one or a plurality of road users 120 having a relatively high relevance. In this case, the relevance can indicate a measure of the potential for interaction with a specific ego-vehicle 110 and/or of the potential for interaction of the road users 120 among one another. By way of example, the relevance can indicate whether a road user 120 will probably overtake, will probably be overtaken, will probably obstruct further travel (on a specific lane), etc.

The service data can comprise, if appropriate, only the relevant road users 120. Alternatively, the service data can comprise an extended amount of road users 120 and emphasize the relevant road users 120 relative to other road users 120.

The service data can indicate one or a plurality of the following items of information:

a recommendation to travel or not to travel along a specific roadway region; and/or an instruction for the driver of a specific ego-vehicle 110 to take action; and/or a movement plan of a road user 120; and/or a time interval and/or a roadway region for maneuvers to be carried out manually or in an automated manner.

By way of example, service data can be transmitted to an ego-vehicle 110 moving in a highly automated manner, wherein the service data represent the following information: "roadway regions in which motorcyclists may appear, in particular currently or in a specific time interval". On the basis of this information, a vehicle function (e.g. a highly automated lane change assistant) which does not have sufficient reliability in the case of maneuvering with motorcyclists can shift the maneuver in time or generate concrete instructions for the driver to take action.

Furthermore, it is possible to detect one or a plurality of properties of at least one road user 120 at at least one exit point 212 of the route segment 213. By detecting road users 120 at an entry point 211 and at an exit point 212, it is possible to provide a closed system. In particular, it is possible to determine in a precise manner which road users 120 are situated in a route segment 213. By way of example, it is thus possible to define route segments 213 on roundabouts 220, multi-story car parks, etc.

In this case, it is also possible (as illustrated in FIG. 2a) to take account of turn-offs as exit points 212. As illustrated in FIG. 2a, a whole segment 213 or a partial segment 214, 215 can be taken into account as route segments. For each route segment it is possible to determine in each case the amount of road users 120 to be expected there with the properties thereof. In this case, the properties of the road users 120 can be determined for the respectively entering and/or for the respectively exiting road users 120 (via the respective entry points 211 and/or the respective exit points 212). If appropriate, properties of amounts of road users 120 can be determined even for "convoluted" route segments and/or be made plausible thereby.

In the example illustrated in FIG. 2b, the amount of road users 120 entering and exiting from a structural special situation (in particular a roundabout 220) is determined and service data are determined therefrom and provided for one or a plurality of ego-vehicles 110 to which said roundabout 220 is relevant or (on the basis of the coordinates or route) will be relevant in the near future. Consequently, an ego-vehicle 110 or a corresponding driver assistance system can acquire information about other road users 120 even before the other road users 120 can be detected by the environment sensors 112 of the ego-vehicle 110.

As already set out above, a sensor 131 can be arranged on a vehicle 120. The vehicle 120 can thus have, at least partly, the function of a route monitoring unit (i.e. of a vehicle-external unit) 130, 131. Such a vehicle 120, 131 can be referred to as a detecting road user. A detecting vehicle 120, 131 can be configured (as shown in FIG. 2c) to determine other road users 120 and/or properties of the other road users 120 in a route segment 214. In particular, it is possible to determine such road users 120 which will overtake the vehicle 120, 131 or which the vehicle 120, 131 will overtake. It is then possible to determine a first set (S1) of road users 120 which are situated in a partial segment of the route segment 214 in front of the vehicle 120, 131, and/or it is possible to determine a second set (S2) of road users 120 which are situated in a partial segment of the route segment 214 behind the vehicle 120, 131.

The useful information concerning the determined sets (S1, S2) of road users 120 can then be communicated to an ego-vehicle 110 (if appropriate directly or indirectly) which is situated in the route segment 214 or will be situated therein in the near future. In this case, useful information of the first set S1 can be communicated to an ego-vehicle 110 for a route segment 214 in front of the detecting vehicle 120, 131 and useful information of the second set can be communicated to an ego-vehicle 110 for a route segment 214 behind the detecting vehicle 120, 131.

Consequently, a possibly large route segment 214 can be virtually divided into partial regions (even without the need to provide stationary route monitoring units 130, 131 that are dedicated to the partial regions). A plurality of such detections of partial regions can be carried out (iteratively or else recursively). As necessary, it is thus possible to carry out an arbitrarily small division of the route segments 214 in which it is possible to determine the order or a relatively accurate arrangement of all the road users 120 in a route segment 214 with a relatively small number of detecting vehicles 120, 131. A virtual division of a route segment 214 can be effected perpendicularly or obliquely to the course of the roadway. This last may be expedient in the case of specific oblique detection regions of the vehicle sensor system 131. The boundaries between the partial segments of a route segment 214 can be defined "dynamically" or movably. The combination of real entry points 211 and/or exit points 212 (at fixed vehicle-external units 130, 131) with virtual entry points 211 and/or exit points 212 (at detecting vehicles 120, 131) is also possible and advantageous.

As already set out, route segments 214 can be convoluted with respect to one another. That can mean that these convoluted route segments 214 form partial regions of one another or have overlap regions relative to one another. Consequently, more detailed and more precise amounts of road users 120 (and the properties thereof) can be determined.

By means of a device (in particular sensor system 131) within at least one vehicle 120, 131 situated in a route segment 214 under consideration, it is possible to determine the order or a change in the order of other road users 120 in the route segment 214 having specific properties. Afterward, it is possible to determine or update order information of the amount of road users 120 for at least one partial segment of the route segment 214.

Consequently, a vehicle in a route segment 214 can be configured to detect which other road users 120 (e.g. vehicles having specific classes and/or having specific further properties) will mutually overtake one another, or how these road users 120 are arranged relative to one another, e.g. as a result of lane changes, etc. In this case, determining order information and/or determining corresponding service data can be effected within the vehicle 102, 131 itself or within a central infrastructure device 130.

A measure of the relevance of a road user 120 can be determined. In particular, a measure of the potential for interaction of one road user 120 with another road user can be determined. Such a measure can be determined depending on one or a plurality of determined properties of the road user 120, e.g. on a class of the road user (automobile, truck, transporter, motorcycle, trailer, etc.); on movement data of the road user 120; on a movement difference with respect to an average speed or with respect to a speed of a specific other vehicle; on a signaling/lane/manner of driving of the road user 120; on a determined intention, in particular on a maneuvering intention, of the road user 120; and/or on a degree of automation currently undertaken by the road user 120.

In this case, the potential for interaction relates in particular to a (possible) mutual influencing of other road users 120 in traffic, e.g. when carrying out a maneuver. The potential for interaction can relate to one specific vehicle (possible interaction with this vehicle) and/or to a possible mutual interaction within a group of road users 120 (as it were among one another).

The properties of a road user 120 can comprise permanent properties and/or variable properties and/or relative properties with respect to a specific other road user 120.

Permanent properties can comprise: technical characteristics such as the (external) contour, weight, maneuverability, fixed or variable form (e.g. a variable contour in the case of trailers or semi-trailers), brand, model, etc. This can also include information concerning the class of the road user (automobile, truck, motorcyclist, pedestrian, animal).

Contours of the road user can be detected, if appropriate, by sensors 131 from two or more perspectives, in particular: substantially from above, substantially from the side, and/or substantially from the front. In this case, the properties of a road user 120 can be determined or aggregated from a plurality of such contours, which can be represented in a vector format, and from further information. By way of example, the properties of the road user 120 can comprise a (possibly simplified) 3D model, e.g. of the external dimensions of the road user 120.

Variable (up-to-date) properties can preferably comprise: a position and/or movement data of the road user 120; relative movement data of the road user 120 in particular relative to the ego-vehicle 110, a current driving style (e.g. gradations from: "not very variable position" with respect to the surrounding road users 120 to "constant maneuvering" or "hopping", etc.), a safety distance appropriate for the current traffic situation or for the current driving mode; information about active functions of the road user 120, in particular about active light functions; maneuvering information, in particular automatically identified (specific) maneuvers carried out by the road user 120 or an intention to carry out a (specific) maneuver; and/or signaling status of the road user 120 (flashing indicator actuation, light or audio signals, etc.).

Relative properties (with respect to a specific other road user 120) can preferably comprise: traveling in a specific arrangement, e.g. in the blind spot region, parallel, etc.; overtaking a vehicle, or vice versa; heading for the same point on the roadway at the same time as another vehicle; etc.

In this case, the detection of properties of a road user 120 using means outside the road user 120 can be effected from at least two different perspectives, e.g. using a plurality of means outside the road user 120. The detection from different perspectives makes it possible to determine properties of a road user 120 with an increased accuracy.

In the ego-vehicle 110 that receives service data about a route segment 214, the service data received by an ego-vehicle 110 can be coordinated with the properties of a road user 120 detected using means 112 within the ego-vehicle 110. In particular, an assignment of a road user 120 to specific data from the service data can thus be effected.

The ego-vehicle 110 can thus classify a road user 120 that can be detected by the ego-vehicle 110 using the vehicle-inherent sensor system 112. In this case, the ego-vehicle 110 can e.g. count how many road users 120 of what class have been overtaken or have overtaken. Furthermore, it is thus possible to determine e.g. how many road users 120 of what class should be expected in front of or respectively behind the ego-vehicle 110.

Alternatively or additionally, the coordination can be effected in order to complete the properties of a road user 120. By way of example, a coordination or a fusion of the properties detected from different perspectives (external perspective and vehicle-inherent perspective) can be effected.

The service data can comprise at least one item of external identification information of at least one road user 120 for which useful information (i.e. properties) are provided in the service data. Furthermore, vehicle-side identification information can be detected by means 112 of the ego-vehicle 110. Service data, in particular representing properties of at least one specific road user 120, can then be assigned depending on the detected vehicle-side identification information and/or depending on the external identification information. A (re-)identification or an assignment of concrete road users 120 can thus additionally be effected.

In this case, the identification information of a road user 120 can be detected by the infrastructure sensor system 131 and/or by other means outside the ego-vehicle 110. The identification information can comprise or be dependent on information dependent on a property or a combination of properties of the road user 120. In this case, the one or the plurality of properties used are preferably such that they allow the road user 120 at least within a limited number of road users 120 in an environment to be distinguished, identified and/or recognized again with a high probability.

Furthermore, the identification information can comprise information of an identifier, e.g. the official license number of a vehicle. By way of example, the identification information can comprise a characteristic combination of features of a road user 120 which make this road user 120 (within a limited number of road users 120 in an environment of the ego-vehicle 110) re-identifiable.

Identification information of a road user 120 can be dependent on the following data: an official license number of a vehicle; part of a data set stored in a machine-readable code (e.g. of a vignette or special sticker); a specific property of the road user 120 or a combination of two or more properties of the road user 120. In particular, the at least one property of the road user 120 can be a property which is detectable by the vehicle sensor system 112 or from the vehicle perspective in a particularly simple manner. Alternatively or additionally the identification information can be dependent on: an ID code of a wireless communication of the road user 120; and/or a SIM card number/MAC address in connection with the road user 120.

Consequently, using relatively simple means 112 of an ego-vehicle 110 (e.g. using a camera), it is possible to determine vehicle-side identification information of another road user 120 (e.g. official license number, QR code or a combination of characteristic features) and afterward to read out very much more information about the properties of the road user 120 from the received service data. The latter can then advantageously be used for providing vehicle functions in the ego-vehicle 110.

The communicated useful information can be communicated in such a way that data protection requirements are met.

Depending on the data determined in the method 300, in particular depending on the service data provided, it is possible to determine a type of action, in particular a type of intervention of a vehicle function, for example of a driver assistance function or of a vertical dynamics function, which are required in connection with a probable interaction with a road user 120 when traveling along the specific route segment 214, and/or it is possible to determine a measure of probability that such an action must actually be carried out on account of a (probable) interaction with a road user 120.

Alternatively or additionally, the method 300 can also comprise varying the parameters of a driver assistance function when a maneuver is carried out at least partly in an automated manner, depending on the service data provided. In this case, e.g. specific interventions of a driver assistance function, which relate at least in part to the control of the longitudinal guidance and/or transverse guidance of the ego-vehicle 110, can be varied depending on the service data.

Moreover, depending on the communicated service data, it is possible for example to decide what interventions in the chassis of the ego-vehicle 110 can be carried out in a more or less automated manner, and/or what interventions in the chassis of the ego-vehicle 110 are recommended or suggested to the driver (e.g. by means of information for the driver).

Moreover, in the method 300, depending on the service data provided, it is possible to issue corresponding information for the driver, for example a warning, an instruction to take action, an indication of a spatial region relative to the ego-vehicle 110 (e.g. "in front of the vehicle", "behind the vehicle", "to the right/left of the vehicle", "in the vehicle's own lane", "in an adjacent lane on the right or left").

Moreover, the vehicle function can be prepared and/or parameterized or preconditioned for an implementation of a specific action, e.g. an intervention in the chassis of the ego-vehicle 110, or of an active or passive safety function, depending on the service data provided.

Particularly preferably, the method 300 can be applied in (structural) special regions of a route, e.g. entry to or exit from an expressway, a maneuvering or turning region, a tunnel, an intersection, a multi-story car park. In this case the method 300 can assist in coping with particular challenges of such regions even with vehicles 110 in particular for at least partly automated driving without a very complex sensor system or environment detection system.

The method 300 can be configured in particular in such a way that it does not require continuous or constant detection of the road users 120 in a route segment 214. The method 300 can also be performed in part with the aid of the devices already available, e.g. interstate highway bridges, slip roads, etc.

With the method 300 it is possible, inter alia, also to increase the overall scope or the performance of the actions readily controllable by the vehicle functions within the roadway segment 214, e.g. maneuvers that can be carried out at least in part.

The method described in this document has a large number of advantages. In particular, the method described enables efficient support of an ego-vehicle 110 in the implementation of a high degree of automation (HDA) with low risks. Furthermore, the method described reduces an uncertainty—which is possible for a vehicle function (in particular HDA) of an ego-vehicle 110—regarding the variety of combinations of road users 120 in the vicinity. The method can also be applied to already existing vehicles. The provision of useful information via a sensor system 131 situated outside a vehicle makes it possible to reduce the costs of the vehicle in respect of sensors 112 and/or in respect of computing power.

The present invention is not restricted to the exemplary embodiments shown. In particular, it should be noted that the description and the figures are intended only to illustrate the principle of the proposed methods, devices and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining at least one road user with a potential for interaction in a route segment, wherein the method comprises the acts of:
   detecting, using a unit outside a first vehicle, information with respect to a plurality of road users entering a route segment at an entry point to the route segment, wherein the information comprises information about one or more properties of the plurality of road users;
   determining service data based on the information with respect to at least one of the plurality of road users;
   determining that the first vehicle is situated in the route segment or will be situated in the route segment after a predefined time interval has elapsed;
   providing, thereafter, the service data in the first vehicle; and
   using the service data for a vehicle function of the first vehicle;
   wherein the service data further comprise:
     information with respect to a roadway region of the route segment which should be traveled along or should not be traveled along;
     an instruction to a driver of the first vehicle to take action;
     information about a point in time and/or a region in which the route segment can be traveled along manually or in an automated manner; and/or
     a movement plan with respect to a movement of a road user and/or of the first vehicle in the route segment.

2. The method as claimed in claim 1, further comprising:
   determining one or more relevant road users from the plurality of road users which are relevant to the first vehicle when traveling along the route segment; and
   determining service data with respect to said determined one or more relevant road users and provided in the first vehicle.

3. The method as claimed in claim 2, wherein determining the one more relevant road users comprises determining a measure of interaction for a given road user of the plurality of road users, wherein the measure of interaction comprises one or more measures of probability for one or more specific types of interactions.

4. The method as claimed in claim 3, wherein the measure of interaction indicates at least one of:

a probability that the first vehicle and the given road user will become spatially closer to one another to a degree exceeding a specific measure within a roadway lane or an adjacent lane;

a probability that the first vehicle will overtake the given road user;

a probability that the first vehicle will be overtaken by the given road user; and/or a probability that the given road user will obstruct travel of the first vehicle on a roadway of the route segment.

5. The method as claimed in claim 3, wherein the measure of interaction for the given road user is determined based on one or more properties of a type of the given road user, on movement data of the given road user, on a relative speed of the given road user, on a predicted intention of the given road user, on a current lane of the given road user, and on a degree of automation of the given road user.

6. The method as claimed in claim 4, wherein the measure of interaction for the given road user is determined based on one or more properties of a type of the given road user, on movement data of the given road user, on a relative speed of the given road user, on a predicted intention of the given road user, on a current lane of the given road user, and on a degree of automation of the given road user.

7. The method as claimed in claim 1, wherein the service data further indicate at least one of:

a type of an intervention of a vehicle function in a chassis of the first vehicle, on account of an interaction with the at least one road user, which should be carried out; and a probability that a specific action of a vehicle function of the first vehicle will be necessary on account of an interaction with the at least one road user.

8. The method as claimed in claim 1, wherein the method further comprises detecting, by a further unit outside the first vehicle, information with respect to at least one road user leaving the route segment at an exit point, wherein the service data are also determined based on the information with respect to the at least one road user leaving the route segment at the exit point.

9. The method as claimed in claim 1, wherein a unit outside the first vehicle comprises a detecting road user situated in the route segment; and the detecting road user comprises one or more environment sensors configured to detect other road users in an environment of the detecting road user.

10. The method as claimed in claim 9, wherein the environment of the detecting road user comprises a partial region of the route segment; and information with respect to at least a large portion of road users in the route segment is detected by a plurality of detecting road users in the route segment.

11. The method as claimed in claim 1, wherein determining service data comprises determining, based on the information with respect to the plurality of road users, order information representing an order of the road users in the route segment on one or more specific roadway lanes.

12. The method as claimed in claim 1, wherein said one or more properties of a given road user of the plurality of road users comprise one or more of:

a permanent property of the given road user;

a variable, current property of the given road user; and a relative property of the given road user, relative to another road user or to a current traffic situation.

13. The method as claimed in claim 1, wherein the method further comprises:

detecting, by the first vehicle, environment data with respect to an environment of the first vehicle; and coordinating the service data with the environment data.

14. The method as claimed in claim 1, wherein the service data comprise external identification information with respect to at least a first road user of the plurality of road users;

the external identification information makes it possible to identify the first road user in the plurality of road users in the route segment;

the method further comprises detecting, by the first vehicle, vehicle-side identification information that makes it possible to identify the first road user in a limited amount of different road users; and the method further comprises extracting information with respect to the first road user from the service data, based on the external identification information and on the vehicle-side identification information.

15. A computer program product configured to be executed on a processor to determine at least one road user with a potential for interaction in a route segment, wherein the computer program product includes a non-transitory medium having software code segments stored thereon which, when executed by the processor, are configured to:

detect, using a unit outside a first vehicle, information with respect to a plurality of road users entering a route segment at an entry point to the route segment, wherein the information comprises information about one or more properties of the plurality of road users;

determine service data based on the information with respect to at least one of the plurality of road users;

determine that the first vehicle is situated in the route segment or will be situated in the route segment after a predefined time interval has elapsed; and provide, thereafter, the service data in the first vehicle;

wherein the service data further comprise:

information with respect to a roadway region of the route segment which should be traveled along or should not be traveled along;

an instruction to a driver of the first vehicle to take action;

information about a point in time and/or a region in which the route segment can be traveled along manually or in an automated manner; and/or a movement plan with respect to a movement of a road user and/or of the first vehicle in the route segment.

16. A unit outside a first vehicle, which unit is configured to:

determine information with respect to a plurality of road users entering a route segment at an entry point to the route segment; wherein the information comprises information about one or more properties of the plurality of road users;

determine service data based on the information with respect to the plurality of road users;

determine that the first vehicle is situated in the route segment or will be situated in the route segment after a predefined time interval has elapsed; and provide, thereafter, the service data to the first vehicle;

wherein the service data further comprise:

information with respect to a roadway region of the route segment which should be traveled along or should not be traveled along;

an instruction to a driver of the first vehicle to take action;

information about a point in time and/or a region in which the route segment can be traveled along manually or in an automated manner; and/or a movement plan with respect to a movement of a road user and/or of the first vehicle in the route segment.

17. The unit as claimed in claim 16, wherein the unit is further configured to:
   determine one or more relevant road users from the plurality of road users which are relevant to the first vehicle when traveling along the route segment; and
   determine service data with respect to said determined one or more relevant road users and provided in the first vehicle.

18. The unit as claimed in claim 17, wherein the unit is configured to determine the one more relevant road users by determining a measure of interaction for a given road user of the plurality of road users, wherein the measure of interaction comprises one or more measures of probability for one or more specific types of interactions.

19. A method for determining at least one road user with a potential for interaction in a route segment, wherein the method comprises the acts of:

detecting, using a unit outside a first vehicle, information with respect to a plurality of road users entering a route segment at an entry point to the route segment, wherein the information comprises information about one or more properties of the plurality of road users;

determining service data based on the information with respect to at least one of the plurality of road users;

determining that the first vehicle is situated in the route segment or will be situated in the route segment after a predefined time interval has elapsed;

providing, thereafter, the service data in the first vehicle; and using the service data for a vehicle function of the first vehicle;

wherein said one or more properties of a given road user of the plurality of road users comprise one or more of:
   a permanent property of the given road user;
   a variable, current property of the given road user; and
   a relative property of the given road user, relative to another road user or to a current traffic situation.

* * * * *